July 25, 1950

C. M. MOORE 2,516,583

HOSE COUPLING DEVICE

Filed Aug. 29, 1947

INVENTOR
C. MAURICE MOORE,
BY
Almon S Nelson
ATTORNEY

INVENTOR
C. MAURICE MOORE,
BY
Almon S. Nelson
ATTORNEY

July 25, 1950  C. M. MOORE  2,516,583
HOSE COUPLING DEVICE
Filed Aug. 29, 1947  3 Sheets-Sheet 3

INVENTOR
C. MAURICE MOORE,
BY
Almon S. Nelson
ATTORNEY

Patented July 25, 1950

2,516,583

UNITED STATES PATENT OFFICE 2,516,583

HOSE COUPLING DEVICE

Clyde Maurice Moore, Richmond, Va.

Application August 29, 1947, Serial No. 771,358

19 Claims. (Cl. 285—86)

This invention relates to a hose coupling device and compression members for use therein, and more particularly to coupling devices for use in making hose and/or pipe connections.

One object of the invention is to provide a coupling wherein a contracting annular wedging action is produced for contracting and binding the end of a hose in the coupling around a shank or nipple to provide a primary seal, and for advancing the extremity of the hose into the coupling and against a shoulder for effectively sealing the end face of the hose in the coupling by a powerful axial thrust, thereby providing a secondary seal.

Another object of the invention is to provide a compression member for producing the said wedging action comprising highly machined parts which may be so arranged relative to each other, the hose, and the coupling device as to provide a tertiary seal.

A further object of the invention is to provide a coupling device with a protecting guard which will act to limit the angle at which the hose may be bent and distribute the strain placed upon the hose at the coupling.

Another object of the invention is to provide an efficient, simply constructed and durable coupling device that can be quickly and easily connected to or disengaged from a hose without the use of special tools or equipment, and can in fact, be so connected and disengaged entirely by hand.

Other and further objects of the invention will become apparent as the description proceeds, reference being made to the accompanying drawings forming a part of the present disclosure, wherein:

Figure 19 is a fragmentary longitudinal sectional view illustrating a modified form of annular recess and groove that may be used in connecting all or certain of the component parts of the compression members above referred to.

Referring more particularly to Figs. 1 to 4, 15 and 17 of the drawings, in which one form of coupling device constructed according to the invention is shown, it will be seen that my device comprises a housing or female member 1 having a cylindrical end portion 2 which may be provided with a male or female thread depending upon whether the outlet to which it is to be connected is internally or externally threaded. In the embodiment shown, the end portion 2 is provided with an external screw thread 3 which is adapted to screw into the screw thread of the outlet of a gasoline or oil pump or tank, a nozzle or the like. It may be noted that insofar as the gasoline or oil pump or tank and the like is concerned, the female member or housing may be made an integral part of the pump, tank, nozzle or the like structure, if desired, since it is never necessary to place this member in a vise or the like to remove and replace the hose.

Figure 1:
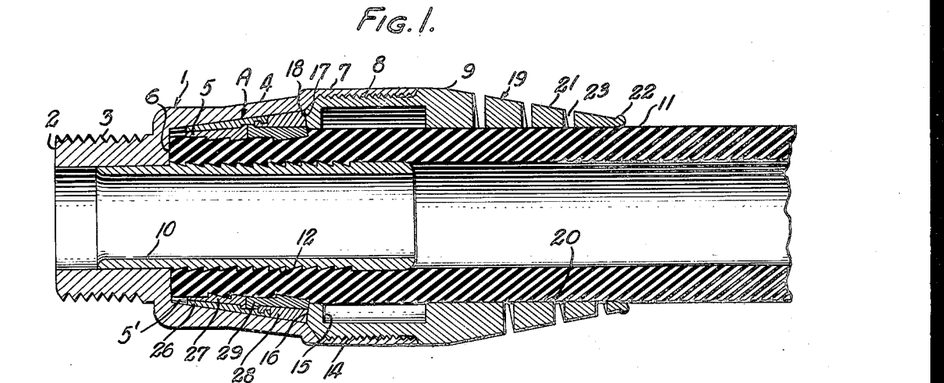
Figure 1 is a longitudinal sectional view taken through a hose coupling constructed according to the present invention showing the hose compressed and advanced into sealing engagement in the coupling.
Figure 2:
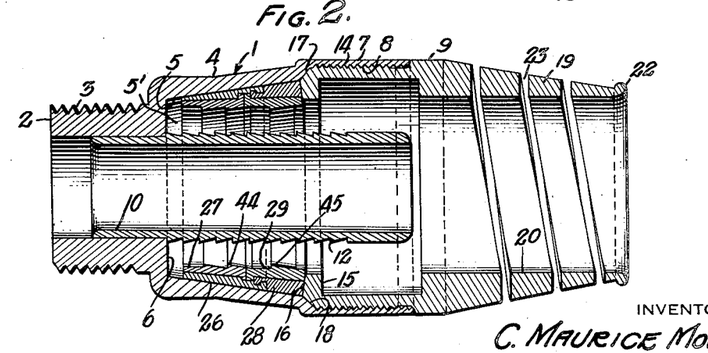
Figure 2 is a similar sectional view with the hose removed.

Integrally associated with the cylindrical end portion 2 of the housing 1 is a sleeve 4 having a tapering inner surface or wall 5 of frusto-conical configuration forming an inwardly or forwardly converging tapered bore 5'. The smallest diameter of the bore 5' is larger than the inner diameter of the end portion 2 and thus an annular shoulder 6 is provided at the inner end of the sleeve 4. The outer end portion 7 of the sleeve 4 is cylindrical or of uniform inner diameter and is provided with an internal screw thread 8 adapted to receive a substantially annular male member or compression nut 9 to be later described.

The cylindrical end portion 2 of the housing 1 carries a nipple or shank 10 therein which extends into and through the sleeve 4 to substantially the outer end thereof. The nipple 10 extends through the sleeve 4 in spaced relation thereto and provides therewith a substantially annular space or chamber into which the free end of a flexible hose 11 is received.

Figure 14:
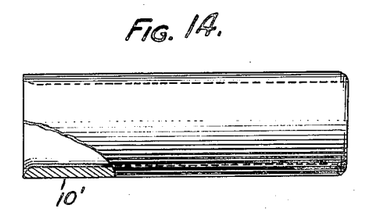
Figures 14, 15 and 16 are side elevational views of three types of nipples or shanks that may be used in my coupling device, parts being broken away, and parts being shown in section.
Figure 15:
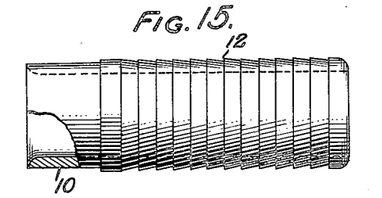
Figure 16:
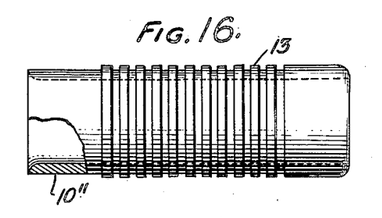

Preferably, the nipple or shank 10 is provided with external shouldered teeth or barbed projections 12 although any desired surface formation may be used. In Fig. 14, for example, the modified form of nipple or shank 10' illustrated has a smooth outer surface, and in Fig. 16, the modified form of nipple 10'' is grooved to provide a spaced series of annular rings 13.

The annular compression nut 9 is provided with an external screw thread 14 at the forward end thereof which is adapted to be received by the screw thread 8 of the member 1. Also, this end of the nut 9 is provided with an inwardly directed annular flange or wall 15 having a rearwardly sloping or tapering forward face 16. The slope of the forward face or wall 16 is preferably such as to form a right angle with the tapering inner surface or wall 5 of the sleeve 4 for a purpose to be later described.

Preferably, but not necessarily, the forward outer edge portion of the nut 9 is beveled as indicated at 17 and engages a complemental flaring wall 18 within the sleeve 4 at the innermost position of the nut 9. Thus the wall 18 functions as a stop member to limit the inward movement of the nut 9.

Figure 17:
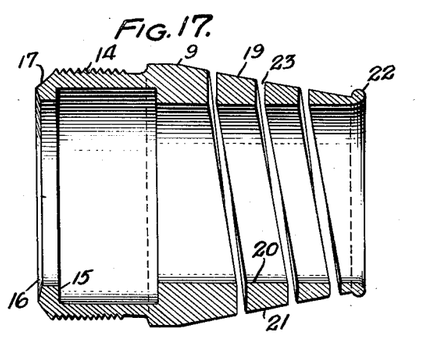
Figure 17 is a longitudinal sectional view of the nut and protecting guard illustrated in Figs. 1 and 2.

The compression nut 9 is preferably provided with an integral tail piece in the form of a protecting annular member or guard 19 which acts to limit the angle at which the hose may be bent and distributes the strain placed upon the hose at the coupling. The guard 19 comprises a bore 20 of substantially uniform diameter to receive the hose 11, and an inwardly tapering outer surface 21, the thickness of the annular guard 19 decreasing toward the free end 22 thereof. The free end 22 is preferably outwardly flared and rounded off in the form of a bead, as illustrated, to prevent damage to the hose, and the guard 19 is spirally cut to form a spiral slot 23. From the foregoing it will be obvious that resistance to bending or lateral movement of the guard 19 gradually increases inwardly from the free end 22 thereof, and hence, the curvature of the hose, when pulled sideways, gradually increases at a safe angle. The hose when pulled sideways is thus supported over an extended portion of its surface and all sharp lines of contact between the hose and coupling are eliminated. Recurring localized strains to which such hose is usually subjected during use are thereby avoided and the life of the hose greatly increased.

Figure 13:
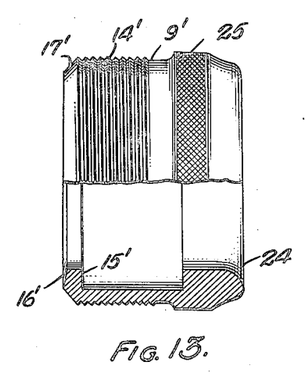
Figure 13 is a side elevational view of a modified form of nut, parts being broken away and parts shown in section.

A modified form of the compression nut 9 is indicated by the reference numeral 9' in Fig. 13. The nut 9' differs from the nut 9 principally in that the annular guard 19 is omitted, and the inner wall at the free end thereof is flared outwardly as indicated at 24. The nut 9' is provided with an external screw thread 14' which is adapted to be received by the screw thread 8 of the member 1, and an inwardly directed annular flange 15' having an inwardly sloping or tapering forward face or wall 16'. As previously described in connection with the nut 9, the slope of the forward face or wall 16' is preferably such as to form a right angle with the tapering inner surface or wall 5, of the sleeve 4 for a purpose to be later described. The forward outer edge portion of the nut 9' may be beveled as indicated at 17', and preferably, a roughened external band 25 is provided on the nut 9' (as well as on the nut 9, but not illustrated) to facilitate the turning thereof.

The type of compression member A illustrated in Figs. 1 to 4 is annular in form and comprises four metallic annular or ring-like elements 26, 27, 28 and 29. Each of the elements 26, 27, 28 and 29 is of split-ring form and has a slot 30, 31, 32 and 33, respectively, extending through a substantial angle to render each element resilient or compressible radially inwardly.

Figure 5:
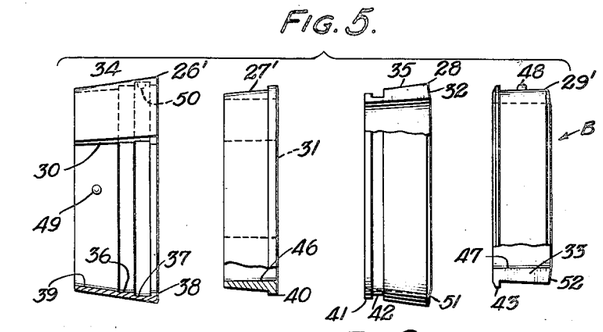
Figure 5 is an exploded side elevational view of a modified form of the compression member illustrated in Figs. 3 and 4, parts being broken away and parts being shown in section, the slots in the several elements being staggered as in actual use.

The compression member B illustrated in Fig. 5 is a slightly modified form of the compression member A. The member B is annular in form and also comprises four metallic annular or ring-like elements 26', 27', 28 and 29', the element 28 being exactly the same in both members A and B. The elements 26', 27', 28 and 29', as illustrated in Fig. 5, have slots 30, 31, 32 and 33, respectively, as previously described.

The angle through which each of the slots 30, 31, 32 and 33 extends is preferably approximately 49°. This angle will vary, however, depending upon the particular metal used, the thickness of the metal, etc., and thus the value of 49° is given merely by way of illustration and not by way of limitation.

The elements 26, 26' and 28 are frusto-conical in side elevation, converging forwardly as illustrated, and the tapering outer walls or surfaces 34, 34 and 35, respectively, have the same taper as the frusto-conical wall 5. The maximum diameter of the tapering bore 5' is preferably just slightly greater than the maximum outer diameter of the member 28 or 28'. This relationship provides substantially maximum compressibility and at the same time permits the compression member to be easily started into the tapering bore 5' before being compressed. The walls 34 and 35, in assembled relationship, form a substantially continuous surface and hence closely engage the wall 5 in the coupling assembly. Since the angle of taper of the bore 5' is equal to the angle of taper of the walls 34 and 35, the compressive stresses are uniformly distributed throughout the entire peripheral area of the compression members. Preferably, the axial length of the bore slightly exceeds the axial length of the compression members above described and to be described, to provide room for expansion of the end of the hose 11, and, assuming that the movement of the compression members into the bore 5' is limited to alignment of the rearward end of the compression member with the rearward end of the bore 5', it is only necessary that the maximum outer diameter of the compression member be greater than the maximum diameter of the bore 5', in order to cause compression of the compression member. In general, it may be stated that the compression members herein disclosed have larger outer diametrical dimensions than the diametrical dimensions of the bore 5'.

The elements 26 and 26' are each provided with two internal, annular recesses 36 and 37, in stepped offset relationship, and an inwardly directed annular flange 38 is provided adjacent the rearward end of the element 26 or 26' and recess 37.

The elements 27 and 27' are so dimensioned as to be received within the forward end portion 39 of the element 26 or 26', and each is provided with an external, outwardly directed annular flange 40 adjacent its rearward edge which is adapted to be received within the forward portion of the recess 36 of the element 26 or 26'.

The element 28 is provided externally adjacent its forward end with an outwardly directed annular flange 41 adapted to be received within the recess 37 of the element 26 or 26', and an annular recess or groove 42 to the rear of and adjacent the flange 41 which is adapted to receive the flange 38 of the element 26 or 26'.

The elements 29 and 29' are so dimensioned as to be received within the element 28, and each is provided adjacent its forward edge with an external, outwardly directed annular flange 43 which is adapted to be received within the rearward portion of the recess 36 of the element 26 or 26'.

The elements 27 and 27', 29 and 29', differ primarily in the contour of the inner walls thereof. Thus, as illustrated, the walls of the elements 27 and 29 are provided internally with one or more shouldered teeth or barbed projections 44 and 45, respectively, whereas the inner walls of the elements 27' and 29', are smooth as indicated at 46 and 47, respectively. Additionally, the element 29' is provided with an outwardly extending projection or headed pin 48. The pin 48 is preferably positioned 180° from the longitudinal center of the opening 33. If desired, the element 29 may be provided with a similar projection or headed pin.

The element 26' differs from the element 26 in that the element 26 is provided with two inwardly extending projections or headed pins 49 and 50. The pin 49 is positioned preferably on the forward end portion 39 and spaced 180° from the longitudinal center of the opening 30. The pin 50 is positioned in the slot 31 and preferably spaced 90° from the pin 49. Obviously, if desired, the element 26 may be provided with pins such as the pins 49 and 50.

The rearward edge 51 of the element 28 forms a right angle with the surface 35 and the rearward edge 52 of the element 29 or 29' forms a continuation of the edge 51. Thus the forward face 16 or 16' of the annular wall 15 or 15' of the nut 9 or 9' squarely engages the rearward edge or edges of the compression members, and the force applied thereto is, in its entirety, applied along the annular walls of the elements forming the compression member in a direction parallel to the outer tapering surfaces 34 and 35 thereof, or in other words, in a direction parallel to the inner wall or surface 5 of the sleeve 4. Thus maximum utilization of the force applied is obtained.

Figure 3:
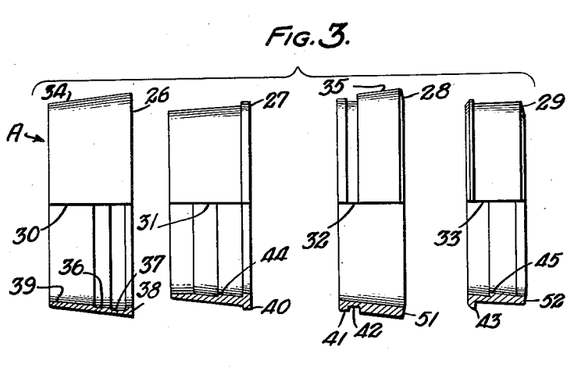
Figure 3 is an exploded side elevational view of the form of compression member illustrated in Figs. 1 and 2, parts being shown in section, and the slots in each element aligned.
Figure 4:
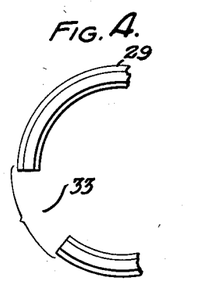
Figure 4 is a fragmentary end elevational view of the right element of the compression member illustrated in Fig. 3 looking to the left, and illustrating the slot formed in each element of the compression member.

The preferred manner of assembling the compression member A illustrated in Fig. 3 is as follows:

The longitudinal centers of the slots 30 and 31 of the elements 26 and 27 are displaced 180° and the element 27 is passed into and through the rearward portion of the element 26 until the flange 40 abuts the forward edge of the recess 36. The longitudinal centers of the slots 32 and 33 of the elements 28 and 29 are displaced 180° and the element 29 is passed into and rearwardly through the element 28 until the flange 43 abuts the flange 41. The elements 28 and 29 are then compressed radially inwardly, and, with the longitudinal centers of the slots 32 and 33 displaced 90° from the longitudinal centers of the slots 30 and 31, the elements 28 and 29 are passed into the rearward edge portion of the element 26 and the flange 41 positioned in the recess 37. In this position, the flange 43 of the element 29 abuts the flange 40 of the element 27. Ordinarily, friction between the elements is sufficient to maintain the same in the annularly spaced relationship above described, since, in assembling, it is unnecessary to apply any rotational force to the various elements.

The modified form of compression member B illustrated in Fig. 5 may be assembled in the same manner as that just described in connection with the compression member A. Fig. 5 illustrates the slots 30, 31, 32 and 33 angularly spaced as above described and, it will be obvious from this figure that the projections or pins 48, 49 and 50 limit the relative rotational movement of the various elements. Thus the pin 49 is so positioned as to engage the sides of the slot 31 to limit such movement between the elements 26' and 27'; the pin 48 is so positioned as to engage the sides of the slot 32 to limit such movement between the elements 28 and 29'; and the pin 50 is so positioned as to also engage sides of the slot 32 to limit such movement between the elements 26' and 28.

Figures 6, 7:
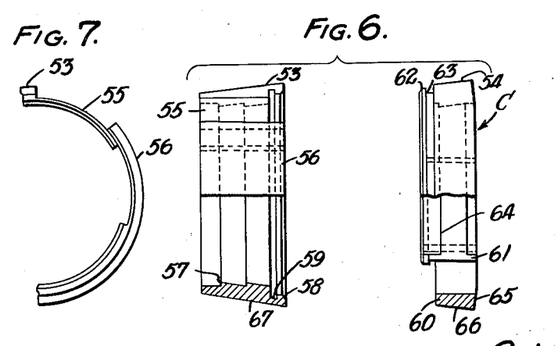
Figure 6 is an exploded side elevational view of a still further modified form of compression member, parts being shown in section.
Figure 7 is a fragmentary end elevational view of the left element of the compression member illustrated in Fig. 6, looking to the right (the lower right quadrant of this element is omitted in Fig. 6)
Figure 8:
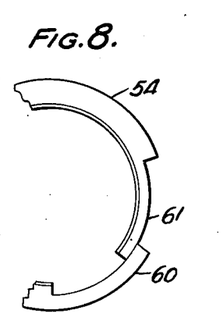
Figure 8 is a fragmentary end elevational view of the right element of the compression member illustrated in Fig. 6, looking to the left (the lower left quadrant of this element is omitted in Fig. 6)

The modified form of compression member C illustrated in Figs. 6, 7 and 8 is annular in form and comprises two annular or ring-like elements 53 and 54. The element 53 is of split-ring form and has two relatively movable, overlapping end portions 55 and 56 of reduced thickness to render the element resilient or compressible radially inwardly. The element 53 is provided internally, in the form illustrated, with a plurality of shouldered projections or barbed teeth 57. The rearward edge portion of the element 53 is provided with an inwardly directed annular flange 58 and an annular recess 59 inwardly of and adjacent the flange 58.

The element 54 is also of split-ring form and has two overlapping end portions 60 and 61 of reduced thickness. The forward end portion of the element 54 is provided externally thereof with an outwardly directed annular flange 62 adapted to be received in the recess 59, and an annular recess 63 rearwardly of and adjacent the flange 62 adapted to receive the flange 58. If desired, the element 54 may be provided also with a shouldered tooth or barbed projection 64, and the rearward edge 65 preferably extends inwardly at an angle of 90° from the outer surface 66 for the reasons previously described.

In assembling the compression member C, the element 54 is compressed radially inwardly, passed into the rearward end of the element 53, and the flange 62 positioned in the recess 59. Preferably the longitudinal center line of overlapping ends 55 and 56 is spaced 180° from the longitudinal center line of the overlapping ends 60 and 61.

As illustrated, the elements 53 and 54 are frusto-conical in side elevation, converging forwardly, and, in assembled relationship the tapering outer walls or surfaces 67 and 66, respectively, form a substantially continuous surface having the same taper as the frusto-conical wall 5 and closely engages the same. The minimum outer diameter of the element 53 relative to the maximum diameter of the bore 5' is preferably the same as that previously described, although not necessarily so, as also previously described. It is to be understood that the barbed projections 57 and 64 may be omitted if desired.

Figure 9:
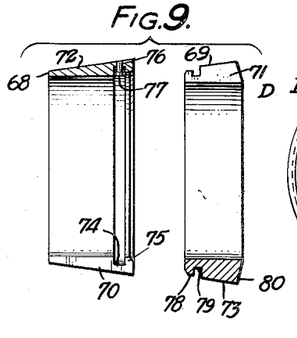
Figure 9 is an exploded longitudinal sectional view of a modification of the compression member illustrated in Fig. 6.
Figure 10:
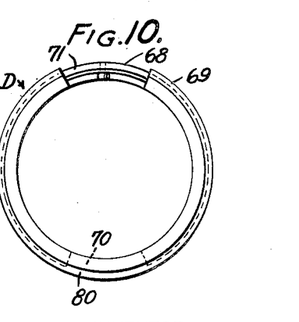
Figure 10 is an end elevational view of the compression member illustrated in Fig. 9 with the component parts thereof in assembled relation.

The modified form of compression member D illustrated in Figs. 9 and 10 is also annular in form and comprises two annular or ring-like elements 68 and 69. Each element 68 and 69 is of split ring form and has a slot 70 and 71, respectively, extending through a substantial angle, such as 49° as above described, to render the same resilient or compressible radially inwardly.

The elements 68 and 69 are frusto-conical in side elevation, converging forwardly as illustrated, and in assembled relationship, the tapering outer walls or surfaces 72 and 73, respectively, form a substantially continuous surface having the same taper as the frusto-conical wall 5, and closely engages the same. The minimum outer diameter of the element 68 preferably bears the same relation to the maximum diameter of the bore 5' as previously described, although not necessarily so, as also previously described.

The element 68 is provided internally and adjacent the rearward edge thereof with an annular recess 74 and an annular flange 75 rearwardly of and adjacent the recess. The recess 74 is provided with a small bore 76 to receive an inwardly extending projection or headed pin 77 at a point substantially 180° removed from the longitudinal center line of the slot 70. The manner of mounting the pins 49, 50 and 51 may be identical with that shown in Fig. 9, if desired.

The element 69 is provided externally adjacent its forward edge with an outwardly directed annular flange 78 adapted to be received within the recess 74, and an annular recess 79 rearwardly thereof and adjacent thereto adapted to receive the flange 75. The rearward edge of the element 69, or at least the outer portion 80 thereof, preferably forms a right angle with the surface 73 for the reasons previously described.

In assembling the compression member D, the longitudinal centers of the slots 70 and 71 are displaced 180°, the element 69 is compressed radially inwardly, and the flange 78 positioned in the slot 74. The pin 77 is so positioned to engage the sides of the slot 71 and thus limit the relatively angular or rotational movement between the elements 68 and 69.

Figure 11:
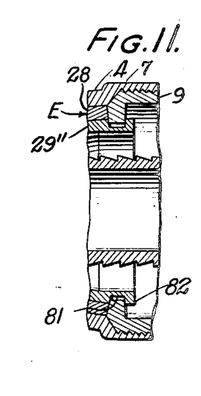
Figure 11 is a fragmentary longitudinal sectional view taken through a hose coupling constructed in accordance with the present invention, illustrating a slightly modified form of the compression member illustrated in Figs. 1 to 4 or Fig. 5.

The compression member E illustrated in Fig. 11 is a slightly modified form of the compression member A. In this form of compression member, the outer rear element 28 is the same as that previously described, but the inner rear element 29'' differs from the element 29 in that it is slightly longer and provided externally adjacent its rearward end with an annular recess 81, and an outwardly directed annular flange 82 rearwardly of and adjacent the said recess.

The recess 81 is adapted to receive the annular flange 15 of the nut 9 (or 9'), and the flange 82 functions as an extractor for the compression member when the nut 9 is backed out of the outer end portion 7 of the sleeve 4.

In assembling the nut 9 (or 9') with the compression member E, it is only necessary to compress the elements 28 and 29'' radially inwardly until the flange 15 (or 15') will pass over the flange 82 to be received in the recess 81, and this may be done either before or after assembly of the elements 28 and 29'' with the elements 26 and 27.

It will be obvious that the element 29' of the compression member B may be modified, if desired, in the manner just described in connection with the compression member E.

Figure 12:
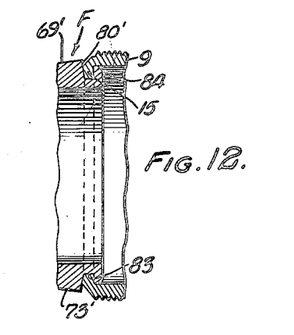
Figure 12 is a fragmentary longitudinal sectional view taken through the nut and compression member and illustrating a slightly modified form of the compression member illustrated in Figs. 6 to 8 or Figs. 9 and 10.

The compression member F illustrated in Fig. 12 is a slightly modified form of the compression member D. In this form of compression member, the rear element 69' differs from the element 69 in that the element 69' is slightly longer and provided externally adjacent its rearward end with an annular recess 83, and an outwardly directed annular flange 84 rearwardly of and adjacent the said recess. The forward edge 80' of the recess 83 forms a right angle with the external surface 73' of the element 69' for the reasons previously described.

The recess 83 is adapted to receive the annular flange 15 of the nut 9 (or 9'), and the flange 84 functions as an extractor for the compression member in the manner previously described in connection with the compression member E.

In assembling the nut 9 (or 9') with the compression member F, it is only necessary to compress the element 69' radially inwardly until the flange 15 (or 15') will pass over the flange 84 to be received in the recess 83, and this may be done either before or after assembly of the element 69' with the element 68.

It will be obvious that the element 54 of the compression member C may be modified, if desired, in the manner just described in connection with the compression member F.

In the preferred manner of assembling my coupling device, the nut 9 (or 9') is slipped over the end of the hose, followed by the compression member A, B, C, D, E or F, and both the nut and compression member are positioned rearwardly of the end of the hose a distance sufficient to permit the end of the hose to be easily passed over the nipple 10 (10' or 10'') and abut the shoulder 6. Then the nut 9 (or 9') is forced forwardly, pushing the compression member into the sleeve 4 until the thread 14 (or 14') reaches the thread 8. The nut 9 (or 9') is then rotated to screw the thread 14 (or 14') into the thread 8.

The compression member frictionally engages the outer surface of the hose 11 and as the nut 9 (or 9') is axially advanced into the sleeve 4, the compression member is gradually contracted about the hose, incident to the taper of the wall 5, and the hose is contracted about the nipple 10 (10' or 10''). By staggering the splits in the split-ring compression elements in the manner described above, a more uniform contraction of the hose about the nipple is obtained. The frictional engagement between the compression member and the hose 11 is such that the compression member is held from turning on the hose, and as the nut progresses axially into the housing the hose is urged forwardly toward the annular shoulder 6 and the end portion of the hose is caused to become compressed axially and expanded radially. Thus a primary seal is provided between the hose 11 and the nipple 10 (10' or 10''), and a secondary seal is provided between the end of the hose and the annular shoulder 6.

As stated previously, the nut may be actuated entirely by hand, if desired. By actual test, a hose connected to my coupling device by hand has withstood pressures up to 500 lbs. per square inch without leaking. The ordinary operating pressure in gasoline pumps, gasoline and fuel oil tanks, and the like, is approximately 40 lbs. per square inch.

Upon failure of the hose at or within the coupling, the nut 9 (or 9') may be backed out of the sleeve 4 and the hose pulled from the nipple 10 (10' or 10''). If the compression member is of the type illustrated in Figs. 11 and 12, the compression member will be removed with the nut. If not, the compression member will be removed with the hose. The faulty end of the hose may be cut off, and the hose reconnected to the coupling device in the manner previously described.

Figure 18:
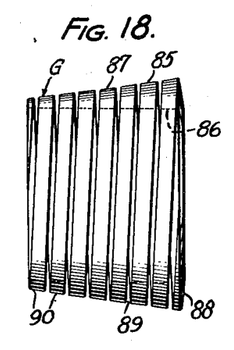
Figure 18 is a side elevational view of a still further modified form of compression member.

The modified form of compression member G illustrated in Fig. 18 comprises an annular elements 85 having a hose receiving bore 86 of substantially uniform diameter to receive the hose 11, and a tapering outer surface or wall 87, converging forwardly, whereby the thickness of the annular member 85 decreases forwardly.

The rearward edge 88 of the annular element 85 preferably forms a right angle with the outer surface or wall 87 for the reasons previously described, and the angle of taper of the outer surface 87 is the same as the angle of taper of the bore 5'.

To provide for compression radially inwardly as well as longitudinally thereof, the element 85 is spirally cut to form a spiral slot 89 extending therethrough from edge to edge.

If desired, the edge 88 of the element 85 may be modified in the manner illustrated in Fig. 12 to provide the same with an annuar recess and flange to connect the nut 9 (or 9') thereto.

The manner of assembling the coupling device with the hose 11, using the compression member G, is the same as previously described in connection with the other compression members disclosed. It will be obvious that when the element 85 is compressed about the flexible hose 11, that portions of the hose will be gripped between adjacent turns 90 and hence the hose will be urged forwardly toward the annular shoulder 6 of the housing 1 to form a secondary seal in the manner previously described.

Figure 19:
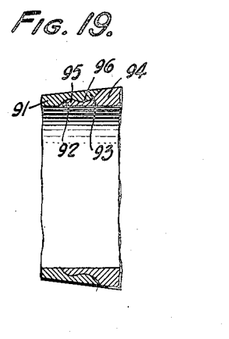

Figure 19 illustrates a modified form of annular recess and groove that may be used instead of the angular or rectangular recesses and grooves 37, 38 and 42, 41, respectively, of Figs. 3 and 5; 59, 58, and 63, 62, respectively, of Fig. 6; and 74, 75 and 79, 78, respectively, of Fig. 9, for examples. Thus, as illustrated in Fig. 19, the forward compression element 91 has an internal recess 92 having a transversely curved surface, and an adjacent inwardly extending edge flange 93 having a transversely curved surface.

The rearward compression element 94 has an outwardly extending edge flange 95 having a transversely curved surface adapted to be received within the recess 92, and an adjacent recess 96 having a transversely curved surface and adapted to received the flange 93.

The transversely curved recesses and grooves illustrated in Fig. 19 have an advantage in facilitating the assembly of the compression elements.

A tertiary seal is provided by and within each of the compression members described above. Preferably, all surfaces of each of the elements comprising the various compression members are highly machined or polished. Hence, where these surfaces contact with each other, with the wall 5, or with the hose, an effective seal is provided. Also, the mating recesses and grooves described are preferably so constructed as to have sufficient tolerance to prevent leakage.

Referring to Figs. 1 and 5, and assuming fluid has in some manner leaked past the end of the hose 11, it will be seen that the path of least resistance for the fluid to flow into the compression member is through the slot 30. However, due to the fact that the slots 30, 31, 32 and 33 are staggered relative to each other, and due to the fact that all surfaces of the elements 26', 27', 28 and 29' are highly machined, and further due to the fact that the flanges 41 and 38 and recesses 37 and 42 are constructed with sufficient tolerance to prevent leakage, such fluid flow is stopped when the fluid reaches the rearward edge of the recess 42, thereby providing, as stated above, a tertiary seal within the compression members A and B. In a similar manner, fluid flow through the slot 31, should this occur, will be stopped at the forward edge of the flange 43.

Tertiary seals are provided in a similar manner within the compression members C, D, E and F.

It may also be here noted that tertiary seals may be provided within the compression members A, B, C, D, E and F even when provided with the recesses and grooves as illustrated in Fig. 19, since these recesses and grooves having curved surfaces may also be so constructed as to have sufficient tolerance to prevent leakage.

With respect to the compression member G, Fig. 18, the tertiary seal is provided in a slightly different manner in that the forward two or three relatively thin turns 90 are compressed, when pressure is applied, and hence the relatively highly machined facing surface of these turns contact each other to effectively close the spiral slot 89 and thereby provide a tertiary seal.

While the invention is susceptible of various modifications and alternative constructions, I have shown in the drawings and have herein described in detail the preferred embodiments, but it is to be understood that I do not thereby intend to limit the invention to the specific forms disclosed, but intend to cover all modifications and alternative constructions falling within the spirit and scope of the invention as expressed in the appended claims.

I claim:

1. In a compression member for use in a flexible hose coupling device, a unitary annular element having an external tapered wall surface, the surface of a rearward edge of said element forming substantially a right angle with said tapered wall surface, and a spiral slot comprising a plurality of turns extending in a continuous manner entirely through said element, whereby said element may be compressed axially and radially inwardly by means of pressure applied against the said rearward edge of said element.

2. In a compression member for use in a flexible hose coupling device, a plurality of split-ring elements, at least one of said elements having an external tapered wall surface, and means connecting said elements together against substantial relative axial movement but for relative angular movement.

3. In a compression member for use in a coupling device, a plurality of split-ring elements, at least one of said elements having an external tapered wall surface, means connecting said split-ring elements together against substantial relative axial movement but for relative angular movement with the splits thereof angularly spaced from each other, and means limiting the relative angular movement of said elements.

4. In a compression member for use in a coupling device, a plurality of split-ring elements, at least one of said elements having an external tapered wall surface, means connecting said split-ring elements together against substantial relative axial movement but for relative angular movement with the splits thereof angularly spaced from each other, and a projection on one of said elements extending into the split of another of said elements.

5. In a compression member for use in a coupling device, a plurality of split-ring elements, at least one of said elements having an external tapered wall surface, an annular flange on one of said elements, and an annular groove in another of said elements receiving said flange and connecting said elements together for relative angular movement.

6. In a compression member for use in a coupling device, a plurality of split-ring elements, at least one of said elements having an external tapered wall surface, an annular flange on one of said elements, an annular groove in another of said elements receiving said flange and connecting said elements together for relative angular movement, the splits in said split-ring elements being angularly spaced from each other, and means limiting the relative angular movement of said elements.

7. In a compression member for use in a coupling device, a plurality of split-ring elements, at least one of said elements having overlapping terminal portions and an external tapered wall surface each of said terminal portions being of uniform thickness in a circumferential direction, the combined thicknesses of the overlapped terminal portions being approximately equal to the thickness of the intermediate portions of the respective split ring elements, an annular flange on one of said elements, and an annular groove in another of said elements receiving said flange and connecting said elements together for relative angular movement.

8. In a compression member for use in a coupling device, a plurality of axially aligned, split-ring elements, each of said elements having an external tapered wall surface, the surface of a rearward edge of the rearwardmost element forming substantially a right angle with its said tapered wall surface, and means connecting said elements together against substantial relative axial movement but for relative angular movement.

9. A coupling device comprising a housing, said housing comprising an annular shoulder and a sleeve, said sleeve having a forwardly tapered bore portion and a threaded end portion, a nipple carried by said housing adapted to receive a hose or the like, said nipple extending into said tapered bore portion and forming an annular space with said sleeve; compression means within said tapered bore, said compression means comprising a unitary annular element having a rearward edge and an external forwardly tapered wall surface, a slot extending in a continuous manner entirely through said element; and a threaded annular compression nut rotatable relative to said compression member in threaded engagement with said threaded end portion of said sleeve, said compression nut comprising a forward annular wall engaging said rearward edge of said element and urging said compression means forwardly into said tapered bore, and the tapered bore portion of said sleeve compressing said compression member radially inwardly.

10. A coupling device comprising a housing, said housing comprising an annular shoulder and a sleeve, said sleeve having a forwardly tapered bore portion and a threaded end portion, a nipple within said housing adapted to receive a hose or the like, said nipple extending into said tapered bore portion and forming an annular space with said sleeve, a compression member within said tapered bore, said compression member comprising an annular element having a rearward edge and an external forwardly tapered wall surface, a spiral slot comprising a plurality of turns extending through said element, means forming an external annular groove comprising a forward wall adjacent said rearward edge of said element, said forward wall forming substantially a right angle with said tapered wall surface, and a threaded annular compression nut in threaded engagement with said threaded end portion of said sleeve, said compression nut comprising a forward, inwardly directed annular wall in said annular groove urging said compression member forwardly into said tapered bore, the tapered bore portion of said sleeve compressing said compression member radially inwardly, and the forward face of said annular wall being inwardly and rearwardly sloping to squarely engage said rearward edge of said element.

11. A coupling device comprising a housing, said housing comprising an annular shoulder and a sleeve, said sleeve having a forwardly tapered bore portion and a threaded end portion, a nipple within said housing adapted to receive a hose or the like, said nipple extending into said tapered bore portion and forming an annular space with said sleeve, a compression member within said tapered bore, said compression member comprising a plurality of split-ring elements, each of said elements having an external tapered wall surface, means connecting said elements together against substantial relative axial movement but for relative angular movement, and a threaded annular compression nut in threaded engagement with said threaded end portion of said sleeve, said compression nut comprising a forward annular wall urging said compression member forwardly into said tapered bore, and the tapered bore portion of said sleeve compressing said compression member radially inwardly.

12. A coupling device comprising a housing, said housing comprising an annular shoulder and a sleeve, said sleeve having a forwardly tapered bore portion and a threaded end portion, a nipple within said housing adapted to receive a hose or the like, said nipple extending into said tapered bore portion and forming an annular space with said sleeve, a compression member within said tapered bore, said compression member comprising a plurality of split-ring elements, each of said elements having an external tapered wall surface, means connecting said split-ring elements together against substantial relative axial movement but for relative angular movement with the splits thereof angularly spaced from each other, means limiting the relative angular movement of said elements, and a threaded annular compression nut in threaded engagement with said threaded end portion of said sleeve, said compression nut comprising a forward annular wall urging said compression member forwardly into said tapered bore, and the tapered bore portion of said sleeve compressing said compression member radially inwardly.

13. A coupling device comprising a housing, said housing comprising an annular shoulder and a sleeve, said sleeve having a forwardly tapered bore portion and a threaded end portion, a nipple within said housing adapted to receive a hose or the like, said nipple extending into said tapered bore portion and forming an annular space with said sleeve, a compression member within said tapered bore, said compression member comprising a plurality of split-ring elements, each of said elements having overlapping terminal portions and an external tapered wall surface, each of said terminal portions being of uniform thickness in a circumferential direction, the compressed thickness of the overlapped terminal portions being approximately equal to the thickness of the intermediate portions of the respective split ring elements, an annular flange on one of said elements, an annular groove in another of said elements receiving said flange and connecting said elements together for relative angular movement, and a threaded annular compression nut in threaded engagement with said threaded end portion of said sleeve, said compression nut comprising a forward annular wall urging said compression member forwardly into said tapered bore, and the tapered bore portion of said sleeve compressing said compression member radially inwardly.

14. A coupling device comprising a housing, said housing comprising an anular shoulder and a sleeve, said sleeve having a forwardly tapered bore portion and a threaded end portion, a nipple within said housing adapted to receive a hose or the like, said nipple extending into said tapered bore portion and forming an annular space with said sleeve, an annular compression member having a forwardly tapered outer wall surface within said tapered bore, a spiral slot comprising a plurality of turns extending through said compression member, and a threaded annular compression nut in threaded engagement with said threaded end portion of said sleeve, said compression nut comprising a forward annular wall urging said compression member forwardly into said tapered bore, and the tapered bore portion of said sleeve compressing said compression member radially inwardly.

15. A coupling device comprising a housing, said housing comprising an annular shoulder and a sleeve, said sleeve having a forwardly tapered bore portion and a threaded end portion, a nipple within said housing adapted to receive a hose or the like, said nipple extending into said tapered bore portion and forming an annular space with said sleeve, a compression member within said tapered bore, said compression member comprising a plurality of axially aligned split-ring elements, each of said elements having an external tapered wall surface, the surface of a rearward edge of the rearwardmost element forming substantially a right angle with its said tapered wall surface, means connecting said elements together against substantial relative axial movement but for relative angular movement, and an externally threaded annular compression nut in threaded engagement with said threaded end portion of said sleeve, said compression nut comprising a forward annular wall urging said compression member forwardly into said tapered bore, the tapered bore portion of said sleeve compressing said compression member radially inwardly, and the forward face of said annular wall being inwardly and rearwardly sloping to squarely engage said rearward edge of said rearwardmost element.

16. A coupling device comprising a housing, said housing comprising an annular shoulder and a sleeve, said sleeve having a forwardly tapered bore portion and a threaded end portion, a nipple within said housing adapted to receive a hose or the like, said nipple forming an annular space with said sleeve, a compression member within said tapered bore, said compression member comprising a plurality of axially aligned split-ring elements, each of said elements having an external tapered wall surface, the surface of a rearward edge of the rearwardmost element forming substantially a right angle with its said tapered wall surface, an annular flange on one of said elements, an annular groove in another of said elements receiving said flange and connecting said elements together, and an externally threaded annular compression nut in threaded engagement with said threaded end portion of said sleeve, said compression nut comprising a forward annular wall urging said compression member forwardly into said tapered bore, the tapered bore portion of said sleeve compressing said compression member radially inwardly, and the forward face of said annular wall being inwardly and rearwardly sloping to squarely engage said rearward edge of said rearwardmost element.

17. A coupling device comprising a housing, said housing comprising an annular shoulder and a sleeve, said sleeve having a forwardly tapered bore portion and a threaded end portion, a nipple carried by and extending into said housing adapted to receive a hose or the like, said nipple forming an annular space with said sleeve, an annular split-ring compression member having a forwardly tapered outer wall surface within said tapered bore, and a threaded annular compression nut in threaded engagement with said threaded end portion of said sleeve, said compression nut comprising a forward annular wall and a tail piece comprising an annular guard member, the external wall surface of said guard member tapering inwardly toward the free end thereof, a spiral slot in said guard member, said forward wall urging said compression member forwardly into said tapered bore, and the tapered bore portion of said sleeve compressing said compression member radially inwardly.

18. A coupling device comprising a housing, said housing comprising an annular shoulder and a sleeve, said sleeve having a forwardly tapered bore portion and a threaded end portion, a nipple within said housing adapted to receive a hose or the like, said nipple extending into said tapered bore portion and forming an annular space with said sleeve, a compression member within said tapered bore, said compression member comprising a plurality of axially aligned split-ring elements, at least one of said elements having an external tapered wall surface, an annular flange on one of said elements, an annular groove in another of said elements receiving said flange and connecting said elements together, and an externally threaded annular compression nut in threaded engagement with said threaded end portion of said sleeve, said compression nut comprising a forward annular wall urging said compression member forwardly into said tapered bore, the tapered bore portion of said sleeve compressing said compression member radially inwardly.

19. A hose coupling comprising a housing member having a sleeve portion, said sleeve portion shaped to receive the end of a hose and having a tapered bore and an internally threaded end portion, a compression member within said tapered bore having a tapered surface which corresponds to the inner surface of said tapered bore, a threaded annular nut engaging the said internally threaded end portion of said sleeve portion to axially and radially compress the compression member within the tapered bore of said sleeve portion, said annular nut having a tail piece in the form of an annular guard member, the outer surface of said guard member tapering inwardly toward the free end thereof, and a spiral slot in said guard member.

C. MAURICE MOORE.

REFERENCES CITED

The following references are of record in the file of this patent:

UNITED STATES PATENTS

| Number | Name | Date |
|---|---|---|
| 796,599 | McIntyre | Aug. 8, 1905 |
| 1,567,324 | Jurs | Dec. 29, 1925 |
| 1,699,591 | Jennings | Jan. 22, 1929 |
| 2,428,176 | Parker | Sept. 30, 1947 |

FOREIGN PATENTS

| Number | Country | Date |
|---|---|---|
| 165,293 | Great Britain | June 30, 1920 |
| 654,476 | France | Nov. 29, 1928 |
| 431,320 | Great Britain | July 4, 1935 |
| 492,959 | Great Britain | Sept. 29, 1938 |